United States Patent
Satgurunathan et al.

(10) Patent No.: US 9,074,038 B2
(45) Date of Patent: Jul. 7, 2015

(54) STAIN RESISTANT URETHANE-VINYL AQUEOUS COATING COMPOSITIONS

(75) Inventors: Rajasingham Satgurunathan, Waalwijk (NL); Gerardus Cornelis Overbeek, Waalwijk (NL); Marc Roelands, Waalwijk (NL); Ronald Tennebroek, Waalwijk (NL); Roel Johannes Marinus Swaans, Waalwijk (NL); Gerhardus Antonius Roescher, Waalwijk (NL)

(73) Assignee: DSM IP ASSETS B.V., Heerlen (NL)

( * ) Notice: Subject to any disclaimer, the term of this patent is extended or adjusted under 35 U.S.C. 154(b) by 1689 days.

(21) Appl. No.: 10/583,266

(22) PCT Filed: Dec. 14, 2004

(86) PCT No.: PCT/GB2004/005227
§ 371 (c)(1),
(2), (4) Date: Sep. 14, 2006

(87) PCT Pub. No.: WO2005/058995
PCT Pub. Date: Jun. 30, 2005

(65) Prior Publication Data
US 2007/0141264 A1    Jun. 21, 2007

(30) Foreign Application Priority Data

Dec. 17, 2003  (GB) .................................. 0329171.3
Jul. 8, 2004    (GB) .................................. 0415310.2

(51) Int. Cl.

| | |
|---|---|
| C08G 18/08 | (2006.01) |
| C08G 18/12 | (2006.01) |
| C08G 18/62 | (2006.01) |
| C08G 18/42 | (2006.01) |
| C08G 18/66 | (2006.01) |
| C09D 175/06 | (2006.01) |
| C08L 33/00 | (2006.01) |

(52) U.S. Cl.
CPC ............ *C08G 18/12* (2013.01); *C08G 18/6216* (2013.01); *C08G 18/6275* (2013.01); *C08G 18/423* (2013.01); *C08G 18/6659* (2013.01); *C08L 33/00* (2013.01); *C09D 175/06* (2013.01)

(58) Field of Classification Search
CPC .. C08L 75/06; C08G 18/423; C08G 18/6216; C08G 18/622; C08G 18/6275
USPC .......... 525/127, 455; 524/507, 589, 590, 591, 524/839, 840; 427/384
See application file for complete search history.

(56) References Cited

U.S. PATENT DOCUMENTS

| | | | | |
|---|---|---|---|---|
| 3,905,929 | A | * | 9/1975 | Noll ............................... 524/839 |
| 4,880,867 | A | * | 11/1989 | Gobel et al. ................... 524/507 |
| 5,594,065 | A | * | 1/1997 | Tien et al. ...................... 524/507 |
| 5,977,215 | A | * | 11/1999 | Tien et al. ...................... 523/415 |
| 6,063,861 | A | * | 5/2000 | Irle et al. ........................ 524/591 |
| 6,239,209 | B1 | * | 5/2001 | Yang et al. ..................... 524/507 |
| 6,342,558 | B1 | * | 1/2002 | Grandhee ....................... 524/457 |
| 6,362,273 | B1 | * | 3/2002 | Martin et al. .................. 524/591 |
| 6,399,718 | B1 | | 6/2002 | Rink et al. |
| 2003/0120024 | A1 | | 6/2003 | Wehrmann et al. |
| 2004/0072934 | A1 | | 4/2004 | O'Rourke et al. |
| 2006/0258801 | A1 | * | 11/2006 | Martin et al. .................. 524/591 |
| 2009/0135239 | A1 | | 5/2009 | Chretien et al. |

FOREIGN PATENT DOCUMENTS

| | | | |
|---|---|---|---|
| EP | 1 408 268 A1 | 4/2004 | |
| EP | 2 161 314 A1 | 3/2010 | |
| GB | 2362387 A * | 11/2001 | ........... C09D 133/12 |
| WO | WO 93/24551 | 9/1993 | |

OTHER PUBLICATIONS

International Search Report.
Uniqema, "PRIPOL—Dimer fatty acids in surface coatings" (Apr. 1999).

* cited by examiner

*Primary Examiner* — Michael L Leonard
(74) *Attorney, Agent, or Firm* — Nixon & Vanderhye P.C.

(57) ABSTRACT

An aqueous coating composition, which when in the form of a film exhibits an MVTR of ≤500 g/m²/24 h comprising 20 to 80 wt % of a polyurethane A with an acid value of 8 to 40 mg KOH/g and a hard segment content ≥40 wt %, a ring structure content ≥48 wt % and 80 to 20 wt % of a vinyl polymer B with a Tg≥20° C.

19 Claims, No Drawings

STAIN RESISTANT URETHANE-VINYL AQUEOUS COATING COMPOSITIONS

This application is the US national phase of international application PCT/GB2004/005227 filed 14 Dec. 2004 which designated the U.S. and claims benefit of GB 0329171.3 and GB 0415310.2, dated 17 Dec. 2003 and 8 Jul. 2004, respectively, the entire content of which is hereby incorporated by reference.

The invention relates to aqueous coating compositions comprising a polyurethane and a vinyl polymer, processes for the manufacture of such compositions and coatings derived therefrom.

Stain resistance is a key property required by the coatings industry for a surface coating on porous substrates such as on wood. In particular this includes resistances towards ethanol, coffee, red wine and mustard.

Current coating products are predominantly based on crosslinked solvent borne polymers, which are undesirable because of unacceptably high volatile organic content (VOC) emissions. The use of waterborne polymers reduces VOC emissions, but substantial crosslinking of the polymer is necessary for adequate stain resistance. External crosslinking agents incur problems because of both toxicity during handling and in uniform mixing with the polymer dispersion. Internal crosslinking, achieved by incorporation of appropriate functionalities into the polymer chain, has limitations with respect to the overall accessibility of the crosslinking functionalities and the point in the film forming process when crosslinking occurs. Consequences of this are films with inferior sensitivity to stains and the formation of less compact or permeable films with poor barrier properties.

It is well known in the coating industry that polyurethane coatings exhibit excellent mechanical properties together with useful resistances to chemicals and solvents. Conventional urethanes for coatings are prepared in organic solvents and subsequently crosslinked to provide useful coatings. A drawback of these coatings are the high VOC emissions, which has been addressed by the use of water dispersible polyurethanes. It is now also known that the properties of coatings can be modified and improved by incorporation of vinyl polymers, and in particular acrylic polymers, into the dispersions. This may be effected either by means of a simple blend of preformed polyurethane and vinyl dispersions or by polymerisation in situ of vinyl monomers in the presence of a preformed polyurethane to form a hybrid system.

U.S. Pat. No. 6,063,861 describes self crosslinkable polyurethane-polyacrylate hybrid dispersions formed by polymerisation of an acetoacetoxy containing vinyl monomer in the presence of a polyurethane, and further containing a difunctional amine. Solvent resistances to water, ethanol and acetone were reported.

U.S. Pat. No. 5,977,215 describes self crosslinkable urethane-acrylic hybrids wherein the crosslinking is provided by pendant carboxyl functionality on the polyurethane and pendant epoxide groups provided by glycidyl(meth)acrylate. Solvent resistance to ethanol determined by swell ratio measurement shows that crosslinking was considered essential to solvent resistance.

U.S. Pat. No. 6,239,209 describes polyurethane-acrylic hybrid interpenetrating polymer networks comprising air curable ethylenic unsaturated functionality which give rise to films of good chemical resistance to water, coffee, tea and mustard.

U.S. Pat. No. 6,342,558 describes a composition comprising a dispersed polyurethane polymer, a dispersed acrylic polymer and an external crosslinking component which is reactive with at least one of the polyurethane and the acrylic polymer, and wherein the polyurethane has a glass transition temperature of ≤0° C. Films from the compositions have improved chip resistance.

EP 0742239 describes a composition comprising crosslinkable hydroxy-containing hybrid polymers and a water-dispersible polyisocyanate crosslinker wherein the hybrid polymers comprise a water-borne hydroxy-terminated polyurethane prepolymer/acrylate, preferably a hydroxyacrylate. High crosslink density is described as necessary for good solvent resistance.

EP 0643734 describes an aqueous polyurethane dispersion which may include an olefinic polymer, where the polyurethane comprises at least one polyester polyol which incorporates polymerised units derived from a dimer acid, which is considered necessary to obtain a coating with good solvent resistance.

WO99/16805 describes a composition containing a water-dispersed polyurethane polymer and a vinyl polymer with good block resistance and imprint resistance where the urethane polymer component has an acid value of ≥44 mg KOH/g of propolymer solids. Spot tests for water, and coffee and detergent resistance are reported.

U.S. Pat. No. 4,880,867 describes an aqueous coating composition in particular for use in the motor car industry comprising a hydroxyl group containing poly(meth)acrylate resin and an anionic polyurethane resin dispersion.

Surprisingly we have now found that by careful tailoring of polyurethane and vinyl polymer components we can prepare an aqueous coating composition which can offer unexpectedly good stain resistances.

According to the present invention there is provided an aqueous coating composition comprising:
(i) 20 to 80 wt % of a polyurethane A obtained by the reaction of:
(a) an isocyanate-terminated prepolymer formed from components comprising:
  (1) 20 to 80 wt % of at least one polyisocyanate;
  (2) 3 to 10 wt % of at least one isocyanate-reactive polyol of weight average molecular weight <500 Daltons, containing at least one ionic or potentially ionic water-dispersing group;
  (3) 0 to 15 wt % of at least one isocyanate-reactive polyol containing non-ionic water-dispersing groups;
  (4) 17 to 77 wt % of at least one isocyanate-reactive polyol other than (3) of weight average molecular weight ≥500 Daltons;
  (5) 0 to 20 wt % of at least one isocyanate-reactive polyol other than (2) or (3) of weight average molecular weight <500 Daltons;
  where (1), (2), (3), (4) and (5) add up to 100%;
  wherein the polyols (a)(3) to (5) have a total ring structure content ≥48 wt %; and
(b) an active-hydrogen chain extending compound;
wherein polyurethane A has an acid value in the range of from 8 to 40 mg KOH/g and a hard segment content ≥40 wt % by weight of polyurethane A; and
(ii) 80 to 20 wt % of a vinyl polymer B with a glass transition temperature ≥20° C.;
wherein (i) and (ii) add up to 100%;
which composition when in the form of a film exhibits a moisture vapour transmission rate ≤500 g/m²/24 h.

For the purposes of the invention an "aqueous coating composition" means a dispersion or composition of a polymer in an aqueous medium of which water is the principle or only component; that is, water comprises at least 50% of the aqueous medium which may further comprise one or more organic solvents or diluents. Such a composition will typically comprise colloidally dispersed polymer particles, i.e. will typically be in the form of an aqueous polymer latex.

It is evident from all the foregoing that the term "polyurethane" as used in this specification can mean one or more than one polyurethane, and is intended to apply not only to polymers (or prepolymers) having only urethane linkages formed from isocyanate and hydroxyl groups, but also to polymers, prepolymers or polymer segments having, in addition to urethane linkages, linkages formed from isocyanate groups and groups such as primary or secondary amines or thiols.

Preferably the ratio by weight of polyurethane A to vinyl polymer B is in the range of from 70:30 to 30:70 and more preferably 60:40 to 35:65.

For the purposes of the present invention, the hard segment content of a polyurethane is defined as the sum of the wt % of:
(i) polyisocyanate containing components (a)(1);
(ii) active hydrogen chain extending compound (b) of molecular weight ≤200 Daltons;
(iii) all polyol components (a)(2)
(iv) ring structure present in polyol components (a)(3), (a)(4) and (a)(5).

In a preferred embodiment polyurethane A has a hard segment content of ≥50 wt %, more preferably ≥60 wt % and especially ≥70 wt %.

For the purposes of the present invention the ring structure present in the polyols (a)(3) to (a)(5) is defined as the sum of the wt % of ring structure containing building blocks. Polyols (a)(3) and (a)(5) are likely to be individual compounds i.e. building blocks, however polyol (a)(4) is likely to be made up of a number of building blocks which may optionally contain ring structures.

Ring structures (iv) may be part of aliphatic diol components such as for example cyclohexanedimethanol and cyclohexanediacid, or part of aromatic diol components such as for example bis-phenol-A, its derivatives and isophthalic acid.

In a further preferred embodiment the polyols (a)(3) to (5) have a total ring structure content of ≥50 wt %.

Polyurethane A may also comprise olefinic functionality, for example through the incorporation of HEMA (2-hydroxyethylmethacrylate) into the polyurethane.

The polyisocyanate (a)(1) used for making the isocyanate-terminated prepolymer of the polyurethane A is preferably an aliphatic (which term includes cycloaliphatic), aralphatic or aromatic polyisocyanate, or a mixture of aliphatic and aromatic polyisocyanates, and is preferably a diisocyanate.

Examples of suitable aliphatic polyisocyanates include ethylene diisocyanate, 1,6-hexamethylene diisocyanate, isophorone diisocyanate, cyclohexane-1,4-diisocyanate, 4,4'-dicyclohexylmethane diisocyanate, cyclopentylene diisocyanate, p-tetramethylxylene diisocyanate (p-TMXDI) and its meta isomer (m-TMXDI), hydrogenated 2,4-toluene diisocyanate, hydrogenated 2,6-toluene diisocyanate, and 1-isocyanato-1-methyl-3(4-isocyanatomethyl-cyclohexane (IMCI).

Suitable non-aliphatic polyisocyanates include p-xylylene diisocyanate, 2,4-toluene diisocyanate, 1-4-phenylene diisocyanate, 2,6-toluene diisocyanate, 4,4'-diphenylmethane diisocyanate, 2,4-diphenylmethane diisocyanate, and 1,5-naphthylene diisocyanate.

Mixtures of polyisocyanates can be used and also polyisocyanates which have been modified by the introduction or urethane, allophanate, urea, biuret, carbodiimide, uretonimine or isocyanurate residues.

Preferred polyisocyanates are 4,4'-dicyclohexylmethane diisocyanate, isophorone diisocyanate, toluene-2,4-diisocyanate, 4,4'-diphenylmethane diisocyanate and 2,4-diphenylmethane diisocyanate.

Preferably the isocyanate-terminated prepolymer comprises 30 to 70 wt % and more preferably 40 to 65 wt % of component (a)(1).

It will be appreciated that the isocyanate-reactive component (a)(2) to (a)(4) may optionally include an isocyanate-reactive compound which is other than a polyol (e.g. a diamine or an aminoalcohol); however, the polyol component will normally be entirely or substantially comprised of polyol reactant.

Polyurethane A may also comprise components which include crosslinking groups. Crosslinking groups are well known in the art and include groups which may crosslink at ambient temperature (20±3° C.) by a number of mechanisms including but not limited to autoxidation (for example by fatty acid groups containing unsaturated bonds); Schiff base crosslinking (for example the reaction of carbonyl functional groups with carbonyl reactive amine and/or hydrazine functional groups); silane crosslinking (for example the reaction of alkoxy silane groups in the presence of water) and epoxy groups crosslinking with epoxy-reactive functional groups. Such crosslinking groups may either give rise to crosslinking without the need for added external crosslinker and/or may give rise to crosslinking only on the addition of an external crosslinker to the aqueous composition of the invention.

Preferably such crosslinking groups form part of the isocyanate-reactive component (a) (4).

Polyurethane A may be dispersible in water to form a stabilised dispersion solely by use of an external surfactant. Preferably polyurethane A has internal water-dispersing groups built into its structure (preferably in pendant and/or terminal positions) during its synthesis (usually as part of the prepolymer), which render the polyurethane self-water-dispersible, optionally in conjunction with an external surfactant. Such internal water-dispersing groups are more usually chain pendant groups and may be ionic (cationic or anionic) or nonionic, or a combination thereof, and may form part of the isocyanate-reactive components and/or the polyisocyanate, and/or may form part of the active hydrogen chain extending compound (b). Most preferably they form part of the isocyanate-reactive components and/or the polyisocyanate since this results in a self-water-dispersible polyurethane or isocyanate-terminated prepolymer.

Ionic water-dispersing groups comprised by the polyol (a)(2) and optionally (a)(4) when cationic dispersing groups are preferably quaternary ammonium groups, and when anionic dispersing groups are preferably —$SO_3^-$, —$OSO_3^-$, —$PO_3^-$, and in particular a carboxylate salt group —$CO_2^-$. Groups which are subsequently converted to dispersing groups are particularly unionised (or substantially unionised) acid or basic groups which can be converted to corresponding anionic or cationic groups by neutralisation or quaternisation. Examples of polyol (a)(2) include carboxyl group-bearing diols and triols, and in particular dihydroxy alkanoic acids. The most preferred carboxyl-bearing polyol is 2,2-dimethylol propionic acid (DMPA). Another preferred one is 2,2-dimethylol butanoic acid (DMBA). A mixture of DMPA and DMBA may also be used.

Where the water-dispersing groups are of the anionic type, such as carboxyl groups, which need to be in their neutralised form (such as carboxylate anionic groups) to effect their internal water-dispersing action, the required amount of water-dispersing groups could be achieved by neutralising only a certain proportion of the potential anionic groups (e.g. carboxyl groups) or alternatively, fully neutralising of all such groups.

It is most preferred that ionic groups are incorporated into the isocyanate-terminated prepolymer (and/or less preferably by being part of the chain extender component) via unionised carboxylic-acid groups which are subsequently neutralised to carboxylate ionic groups using neutralising agents such as a tertiary amine, examples of which include triethylamine, triethanolamine, dimethylethanolamine, dimethylaminoethyl-methacrylate or N-methylmorpholine, or an alkaline hydroxide such as K, Na or Li hydroxide or a quaternary ammonium hydroxide. Ammonia itself may also be used.

The conversion of any potentially ionic water-dispersing groups present in the isocyanate-terminated prepolymer to ionic water-dispersing groups may be effected by neutralising before, after or simultaneously with the formation of an aqueous dispersion of the prepolymer.

Preferably the isocyanate-terminated prepolymer comprises 3.5 to 9 wt %, more preferably 4 to 8 wt % of component (a)(2).

The acid value of the polyurethane A is preferably in the range of from 15 to 40 and more preferably 20 to 40 mg KOH/g polyurethane A.

Nonionic water-dispersing groups comprised by polyol (a)(3) are typically pendant polyoxyalkylene groups, particularly polyethylene oxide (PEO) groups. In U.S. Pat. No. 3,905,929 examples of diols having pendant PEO chains are disclosed which may be obtained by reacting one mole of an organic diisocyanate in which the two isocyanate groups have different reactivities with approximately one mole of a polyethylene glycol mono-ether and then reacting the adduct so obtained with approximately one mole of a dialkanolamine, for example diethanolamine. Chain-pendant PEO groups may also be introduced by employing certain amine and hydroxyl functional compounds, or diols, as disclosed in EP 0317258, where such compounds are obtained by oxyalkylating a defined polyether amine containing PEO residues.

If desired, the PEO chains may contain units of other alkylene oxides in addition to the ethylene oxide units. Thus, PEO chains in which up to 60% of the alkylene oxide units are for example propylene oxide units, the remainder being ethylene oxide units, may be used.

Preferably polyurethane A has a polyethylene oxide content of less than 15% by weight and more preferably less than 5% by weight by weight of ethylene oxide groups based on the weight of polyurethane A.

Preferably the isocyanate-terminated prepolymer comprises 0 to 8 wt % and more preferably 0 to 5 wt % of component (a)(3).

The polyol of the isocyanate-reactive component (a)(4) is preferably a diol, but may include a polyol of functionality more than 2. This polyol preferably has a weight average molecular weight (hereinafter Mw) within the range of from 500 to 8,000 Daltons, more preferably from 700 to 3,000 Daltons. Such polyol in principle may be selected from any of the chemical classes of polyols used or proposed to be used in polyurethane synthesis other than those described for components (a)(2) and (a)(3). In particular the polyol may be a polyester polyol, a polyesteramide polyol, a polyether polyol, a polythioether polyol, a polycarbonate polyol, a polyacetal polyol, a polyvinyl polyol and/or a polysiloxane polyol. An especially preferred polymeric polyol (a)(4) has a ring structure content ≥30 wt %, more preferably ≥35 wt %.

Polyester polyols which may be used include hydroxyl-terminated reaction products of polyhydric alcohols such as ethylene glycol, propylene glycol, diethylene glycol, neopentyl glycol, 1,4-butanediol, 1,6-hexanediol, furan dimethanol, cyclohexane dimethanol, bisphenol A derivatives, isophthalic acid, glycerol, trimethylolpropane or pentaerythritol, or mixtures thereof, with polycarboxylic acids, especially dicarboxylic acids or their ester-forming derivatives, for example succinic, glutaric and adipic acids or their methyl esters, phthalic anhydrides or dimethyl terephthalate. Polyesters obtained by the polymerisation of lactones, for example caprolactone, in conjunction with a polyol may also be used. Polyesteramides may be obtained by the inclusion of amino-alchols such as ethanolamine in polyesterification mixtures. Polyesters which incorporate carboxy groups may be used, for example polyesters synthesised by esterification of DMPA and/or DMBA with diols, provided that the esterification is carried out at temperatures below 200° C. to retain the carboxy functionality in the final polyester.

Polyether polyols which may be used include products obtained by the polymerisation of a cyclic oxide, for example ethylene oxide, propylene oxide or tetrahydrofuran or by the addition of one or more such oxides to polyfunctional initiators, for example water, methylene glycol, ethylene glycol, propylene glycol, diethylene glycol, cyclohexane dimethanol, glycerol, trimethylopropane, pentaerythritol or Bisphenol A. Especially useful polyether polyols include polyoxypropylene diols and triols, poly (oxyethylene-oxypropylene) diols and triols obtained by the simultaneous or sequential addition of ethylene and propylene oxides to appropriate initiators and polytetramethylene ether glycols obtained by the polymerisation of tetrahydrofuran.

Polycarbonate diols which may be used include polycarbonate diols based on linear or ring structure building blocks (as described above and including amongst others bisphenol A derivatives, cyclohexane dimethanol and isophthalic acid) or a combination thereof. Examples of linear building blocks include hexanediol, pentanediol and butanediol. Examples of polycarbonate diols include hexanediol-polycarbonate diol and polyhexamethylene carbonate diol.

Preferably the isocyanate-terminated prepolymer comprises 20 to 70 wt % and more preferably 25 to 55 wt % of component (a)(4).

Polyol (a)(5) contains at least one (more preferably at least two) isocyanate-reactive groups and preferably has a weight average molecular weight in the range of from 40 to 250. Examples of polyol (a)(5) include ethyleneglycol, neopentyl glycol, 1-propanol and 1,4-cyclohexane dimethanol. Preferably the isocyanate-terminated prepolymer comprises 0 to 15 wt % and more preferably 0 to 10 wt % of component (a)(5).

The active-hydrogen chain extending compound is preferably an amino-alcohol, a primary or secondary aliphatic, alicyclic, aromatic, araliphatic or heterocyclic diamine or polyamine (i.e. having 3 or more amine groups), or hydrazine or a substituted hydrazine, or a polyhydrazide (preferably a dihydrazide).

Examples of chain extenders useful herein include ethylene diamine, diethylene triamine, triethylene tetramine, propylene diamine, butylene diamine, hexamethylene diamine, cyclohexylene diamine, piperazine, 2-methyl piperazine, phenylene diamine, toluylene diamine, xylylene diamine, tri (2-aminoethyl) amine, 3,3-dinitrobenzidine, 4,4'-diamino-diphenylmethane, methane diamine, m-xylene diamine, isophorone diamine, and adducts of diethylene triamine with acrylate or its hydrolysed products. Also materials such as hydrazine (e.g. in the form of its mono-hydrate), azines such as acetone azine, substituted hydrazines such as, for example, dimethyl hydrazine, 1,6-hexamethylene-bis-hydrazine, carbodihydrazine, dihydrazides of dicarboxylic acids and sulphonic acids such as adipic acid dihydrazide, oxalic acid dihydrazide, isophthalic acid dihydrazide, hydrazides made by reacting lactones with hydrazine such as gamma-hydroxylbutyric hydrazide, bis-semi-carbazide, and bis-hydrazide carbonic esters of glycols. Another suitable class of chain extenders is the so-called "Jeffamine" compounds with a functionality of 2 or 3 (available from Huntsman). These are polypropylene oxide (PPO) or PEO-based di or triamines, e.g. "Jeffamine" T403 and "Jeffamine" D-400.

Preferably the active-hydrogen chain extending compound is or includes hydrazine (usually in the form of its monohydrate), or a di or triamine (usually a diamine) of molecular weight below 300. Water-soluble chain extenders are preferred.

Water itself may be used as an indirect chain extender because it will slowly convert some of the terminal isocyanate groups of the prepolymer to amino groups (via unstable carbamic acid groups) and the modified prepolymer molecules will then undergo chain extension. However, this is very slow compared to chain extension using the active-hydrogen chain extenders.

Preferably polyurethane A has a weight average molecular weight in the range of from 50,000 to 1,000,000 Daltons, more preferably 80,000 to 700,000 Daltons and most preferably between 120,000 to 500,000 Daltons, as measured by Gel Permeation Chromatography (GPC), using THF as a solvent and polystyrene standards.

Preferably the weight average particle diameter (Dw) (i.e. the particle size—since the particles are essentially spherical) of the polyurethane A is within the range of from 20 to 400 nm, more preferably 30 to 150 nm.

The isocyanate-terminated prepolymer may be prepared in conventional manner by reacting a stoichiometric excess of the polyisocyanate with the isocyanate-reactive components under substantially anhydrous conditions at a temperature between about 30° C. and about 130° C. until reaction between the isocyanate groups and the isocyanate-reactive groups is substantially complete. Preferably the ratio of isocyanate groups to isocyanate-reactive groups in the range of from about 1.2:1 to 2.5:1, preferably from 1.4:1 to 2:1 and more preferably from 1.6:1 to 2:1.

If desired, catalysts such as dibutyltin dilaurate or stannous octoate may be used to assist the isocyanate-terminated prepolymer formation. A diluent, such as an organic solvent or a reactive component, may optionally be added before, during or after the isocyanate-terminated prepolymer formation to control the viscosity provided it does not impede obtaining a solvent-free final dispersion (such solvent may thus subsequently need to be removed as far as is possible). It is also possible to put some or all of the solvent into an aqueous medium before dispersing the isocyanate-terminated prepolymer therein. Suitable solvents which may be used include acetone, methylethylketone, dimethylformamide, diglyme, N-methylpyrrolidinone (NMP), N-ethylpyrrolidinone, ethyl acetate, ethylene and propylene glycol diacetates, alkyl ethers of ethylene and propylene glycol diacetates, alkyl ethers of ethylene and propylene glycol monoacetates, toluene, xylene and sterically hindered alcohols such as t-butanol and diacetone alcohol. The preferred solvents are water-miscible solvents such as N-methylpyrrolidinone, N-ethylpyrrolidinone, acetone and dialkyl ethers of glycol acetates or mixtures of N-methylpyrrolidinone and methyl ethyl ketone. In cases where the vinyl polymer B is formed in situ with the polyurethane A, the diluent may comprise (optionally in conjunction with organic solvents of the type described above) a vinyl monomer which is subsequently polymerised as the or as part of the vinyl monomer system to form vinyl polymer B.

The polyurethane A is prepared as an aqueous dispersion by dispersing an isocyanate-terminated prepolymer (optionally carried in a diluent) in an aqueous medium, and simultaneously or subsequently chain extending the prepolymer with an active hydrogen compound. The prepolymer may be dispersed in the aqueous medium using techniques well known in the art. Preferably, the prepolymer is added to the aqueous medium with agitation or, alternatively, the aqueous medium may be stirred into the prepolymer component. Dispersion of the prepolymer is preferably achieved utilising self-dispersibility properties of the prepolymer arising from internal dispersing groups, although free surfactant may additionally be employed if desired.

In an alternative embodiment, the isocyanate-terminated prepolymer for polyurethane A may be dispersed in an aqueous medium in which vinyl polymer B is already present, with a simultaneous or subsequent chain extension. In a further embodiment, known as mass dispersion, the isocyanate-terminated prepolymer may be dispersed in an aqueous medium in which are already dispersed the monomer components for vinyl polymer B, with a simultaneous or subsequent chain extension as described below. The monomer components for vinyl polymer B may then be polymerised. In yet a further embodiment, the manufacture of polyurethane A and/or vinyl polymer B may be carried out by a technique which comprises in-line mixing, as described in Research Disclosure (2002), 457(May), P772-P774.

The chain extender may be added to the dispersed isocyanate-terminated prepolymer, or the chain extender may be present in the aqueous medium prior to dispersion or the chain extender may be added to the prepolymer before or during dispersion or a combination of these techniques may be used.

The chain extension can be conducted at elevated, reduced or ambient temperatures. Convenient temperatures are from about 5° C. to 90° C., more preferably from 10 to 60° C.

The total amount of chain extender employed (other than water) is preferably such that the ratio of active hydrogens in the chain extender to isocyanate groups in the prepolymer is preferably within the range of from 0.6:1 to 2.0:1 more preferably 0.8:1 to 1.2:1. Of course, when water is employed as an indirect chain extender, these ratios will not be applicable since the water, functioning both as an indirect chain extender and a dispersing medium, will be present in a gross excess relative to the isocyanate groups.

By a vinyl polymer B herein is meant a homo- or copolymer derived from the addition polymerisation (using a free radical initiated process and usually in an aqueous medium), preferably by aqueous emulsion polymerisation, of a monomer composition comprising one or more monomers of the formula $CH_2=CR^1R^2$ where $R^1$ and $R^2$ are each independently selected from the group comprising H, optionally substituted alkyl of 1 to 20 carbon atoms (more preferably 1 to 8 carbon atoms), optionally substituted cycloalkyl of 5 to 20 carbon atoms, optionally substituted acyl and others. Such olefinically unsaturated monomers are referred to herein as vinyl monomers. Examples of such vinyl monomers include 1,3-butadiene, isoprene, styrene, α-methyl styrene, divinyl benzene, acrylonitrile, methacrylonitrile, vinyl halides such as vinyl chloride, vinyl fluorides (also known as fluoromonomers), vinyl esters such as vinyl acetate, vinyl propionate, vinyl laurate, and vinyl esters of versatic acid such as VeoVa™ 9 and VeoVa™ 10 (VeoVa is a trademark of Shell), heterocyclic vinyl compounds, alkyl esters of mono-olefinically unsaturated dicarboxylic acids (such as di-n-butyl maleate and di-n-butyl fumarate, and olefinically unsaturated monocarboxylic or dicarboxylic acids, such as acrylic acid, methacrylic acid, 2-carboxyethyl acrylate, fumaric acid, maleic acid, and itaconic acid, and optionally substituted alkyl esters of 1 to 20 carbon atoms thereof such as methylmethacrylate, butylmethacrylate, dimethylaminomethacrylate, and dimethylaminopropylmethacrylate.

Vinyl polymer B may often advantageously contain vinyl monomers which provide an adhesion and/or crosslinking functionality to the resulting polymer coating. Examples of these, include acrylic and methacrylic monomers having at least one free carboxylic, hydroxyl, epoxy, acetoacetoxy, amino or unsaturated group, such as acrylic acid and methacrylic acid (and also their amides, hydroxyalkyl esters and amino alkyl esters), glycidyl acrylate, glycidyl methacrylate, aceto acetoxy ethyl methacrylate, t-butylamino ethyl methacrylate and dimethylamino ethyl methacrylate; allyl methacrylate, tetraethyleneglycol methacrylate, diacetone acrylamide and diviriyl benzene other adhesion promoting monomers include heterocyclic vinyl compounds such as vinyl pyrrolidone and vinyl imidazole.

In one preferred embodiment of the invention, amino functionality may be incorporated into vinyl polymer B by including vinyl monomers having at least one free carboxylic group such as acrylic acid or methacrylic acid and subsequently converting at least a proportion of the carboxylic acid groups to amino groups (as part of amino ester groups) by an imination reaction using an alkylene imine such as ethylene imine or propylene imine.

Such vinyl monomers which provide crosslinking functionality are preferably used in an amount of from 0.1 to 10 weight %, more usually from 0.1 to 5 weight % of the total weight of vinyl monomers used for the polymerisation of vinyl polymer B.

In a preferred embodiment of the invention vinyl polymer B is a hydrophobic polymer. Therefore, the vinyl monomers which form vinyl polymer B preferably have a hydrophobic nature. Preferably ≥50 wt %, more preferably ≥60 wt % and most preferably ≥70 wt % of the vinyl monomers are hydrophobic vinyl monomers. Preferred hydrophobic vinyl monomers are selected from the group consisting of 2-ethylhexylacrylate, styrene, acrylonitrile and trifluoroethylmethacrylate. Preferably vinyl polymer B comprises vinyl monomers comprising in total ≥70 wt % carbon, nitrogen and halogen based on vinyl monomer molecular weight, more preferably ≥75 wt %, and especially ≥80 wt %.

The glass transition temperature (Tg) of the vinyl polymer B, which is the temperature at which it changes from a glassy brittle state to a plastic, rubbery state. Glass transition temperatures may be determined experimentally by Differential Scanning Calorimetry (DSC) or preferably calculated theoretically by means of the Fox equation. Preferably the vinyl polymer B has a Tg of ≥25° C. and more preferably ≥30° C.

In another aspect of the invention, vinyl polymer B is a multiphase vinyl polymer, by which it is meant that it comprises at least two phases with different compositions with preferably distinct Tg values. Preferably, vinyl polymer B has one phase of Tg<20° C. (soft phase) and at least one phase of Tg≥20° C. (hard phase). Preferably there is a difference in Tg values between at least two vinyl polymer phases of ≥20° C.

Vinyl polymer B preferably has a particle size distribution in the range of from 25 to 600 nm more preferably 30 to 500 nm, most preferably 45 to 250 nm and especially 60 to 200 nm. The particle size distribution may be monomodal, bimodal or polymodal, more preferably vinyl polymer B has a bimodal particle size distribution.

Vinyl polymer B may also be an oligomer-supported polymer, by which is meant a low molecular weight oligomer (typically 5,000 to 50,000 Daltons) is first prepared as a stabilising agent for a second phase of the preparation of vinyl polymer B.

Vinyl polymer B may either be prepared separately and then admixed with polyurethane A or vinyl polymer B may be present in the composition as a hybrid by which is meant that vinyl polymer B has been prepared in the presence of a polyurethane during and/or after the latter's formation. The hybrid may then be combined with further polymers, for example, the hybrid may be mixed with separately prepared polymers, or with a sequentially formed pair of polymers (including oligomer supported polymers as described above).

Preferably the acid value of vinyl polymer B is ≤10 mg KOH/g polymer, more preferably ≤5 mgKOH and especially zero.

The weight average molecular weight of vinyl polymer B is preferably in the range of from 50,000 to 6,000,000 Daltons, more preferably 100,000 to 1,000,000 Daltons and most preferably 500,000 to 1,000,000 Daltons.

The polymerisation of the vinyl monomers used to form vinyl polymer B will normally require the use of a free-radical-yielding initiator to initiate the polymerisation. Suitable free-radical-yielding initiators include inorganic peroxides such as K, Na or hydrogen peroxidb, persulphates such as ammonium persulphate or percarbonates; organic peroxides, such as acyl peroxides including for example benzoyl peroxide, alkyl hydroperoxides such as t-butyl hydroperoxide and cumene hydroperoxide; dialkyl peroxides such as di-t-butyl peroxide; peroxy esters such as t-butyl perbenzoate and the like; mixtures may also be used. The peroxy compounds are in some cases advantageously used in combination with suitable reducing agents (redox systems) such as Na or K pyrosulphite or bisulphite, and i-ascorbic acid. Azo compounds such as azoisobutyronitrile (AIBN) may also be used. Metal compounds such as Fe.EDTA (EDTA is ethylene diamine tetraacetic acid) may also be usefully employed as part of a redox initiator system. An initiator system partitioning between the aqueous and organic phases, for example a combination of t-butyl hydroperoxide, iso-ascorbic acid and Fe.EDTA, may be of particular use. The amount of initiator or initiator system to use is conventional, for example within the range 0.05 to 6 wt % based on the total vinyl monomer used.

An aqueous polymerisation to prepare vinyl polymer B may need to be performed in the presence of a stabilising and/or emulsifying material. Conventional emulsifying materials include anionic and/or nonionic emulsifiers such as Na salts of dialkylsulphosuccinates, Na salts of sulphated oils, Na salts of alkyl sulphonic acids, Na, K and ammonium alkyl sulphates such as sodium lauryl sulphate, $C_{22-24}$ fatty alcohols, ethoxylated fatty acids and/or fatty amides, phosphate esters, alcoholvinylethoxylates, and Na salts of fatty acids such as Na stearate and Na oleate. The amount of emulsifier used is usually 0 to 5% by weight on the weight based on the total vinyl monomer used.

A buffer material, such as sodium bicarbonate, is often employed in polymerisations to form vinyl polymers.

When making a polyurethane vinyl hybrid, the vinyl monomer may be introduced in the process at any suitable stage. For example, all of the vinyl monomer for the vinyl polymer B may be added to the isocyanate-terminated prepolymer prior to its dispersion into water, or all of the vinyl monomer may be added subsequent to dispersion (or may have already been added to the water prior to the dispersion of the prepolymer therein), or part of the vinyl monomer may be added to the isocyanate-terminated prepolymer prior to dispersion and the remainder added subsequent to dispersion. In the particular examples of such processes are detailed in U.S. Pat. No. 5,137,961 and U.S. Pat. No. 4,664,430 which are herein incorporated by reference. Furthermore, such a polymerisation may be performed simultaneously with the chain extension step of the prepolymer of polyurethane A, or performed subsequent to the chain extension step, or performed partly simultaneously with the chain extension step and partly subsequent to the chain extension step.

If polyurethane A polymer contains internal dispersing groups, this usually removes the requirement for the use of a separately added conventional emulsifying material since the polyurethane itself acts as an effective dispersant for the vinyl polymerisation, although a conventional emulsifier can be still employed if desired.

A further aspect of the invention comprises a composition as hereinbefore described wherein either or both of polyurethane A or vinyl polymer B are present at least as part of a hybrid.

The solids content of an aqueous composition of the invention is usually within the range of from about 20 to 65 wt % on a total weight basis, more usually 30 to 55 wt %. Solids content can, if desired, be adjusted by adding water or removing water (e.g. by distillation or ultrafiltration).

In an embodiment of the present invention there may be present an ethylenically unsaturated bond functionality capable of crosslinking which is susceptible to initiation by radiation. It is especially preferred that this radiation is uv radiation. Radiation initiated crosslinking may be carried out with or without added photoinitiator. Preferably the composition of the invention comprises one or more multifunctional materials which carry one, preferably two or more radiation polymerisable ethylenically unsaturated bonds which are capable of crosslinking.

A wide variety of radiation curable multifunctional materials may be employed. Typical examples include but are not limited to epoxy(meth)acrylates; urethane (meth)acrylates; multi-functional (meth)acrylate monomers; uv-curable urethane dispersions and amine-(meth)acrylate adducts.

Epoxy(meth)acrylates are products formed by the reaction of (meth)acrylic acid with an epoxy(glycidyl) functional component e.g. aliphatic and aromatic containing epoxy resins, epoxidised oils, acrylic polymers and acrylic grafted polymers in which the acrylic component contains pendent epoxy groups. Some of the (meth)acrylic acid may be replaced by other acids, both ethylenically unsaturated and saturated, so as to impart specific properties e.g. aliphatic acids, fatty acids and aromatic acids. These products may alternatively be prepared by the reaction of a carboxylic acid functional component (e.g. polyesters and acrylic polymers) with a second component containing both epoxy groups and ethylenic unsaturation e.g. glycidyl(meth)acrylate.

Urethane (meth)acrylates are those products formed by the reaction of an isocyanate containing component with a hydroxyl containing component. At least one of these components must contain ethylenic unsaturation. Examples of isocyanate functional components are hexamethylene diisocyanate, isophorone diisocyanate, isocyanate functional acrylic polymers and polyurethanes, reaction products of hydroxyl functional components (e.g. polyethylene glycol, polypropylene glycol and di-, tri-hydroxy aliphatic alcohols (e.g. glycerol and trimethylolpropane) and their ethoxylated, propoxylated and polycaprolactone analogs) with di-, tri-isocyanates (e.g. hexamethylene diisocyanate, isophorone diisocyanate and toluene diisocyanate). Examples of hydroxy containing ethylenically unsaturated components are hydroxyethyl(meth)acrylate and its ethoxylated, propoxylated and polycaprolactone analogs as well as (meth)acrylated polyester polyols and (meth)acrylated polyether polyols.

Preferred urethane (meth)acrylates have a number average molecular weight in the average range of from 300 to 15,000, more preferably 400 to 3,000 Daltons as determined by Gel Permeation Chromatography using polystyrene as a standard and tetrahydrofuran as an eluent.

Multifunctional (meth)acrylate monomers are for example (meth)acrylic acid esters of di- and tri-hydroxyl alcohols (e.g. polyethylene glycol, polypropylene glycol, aliphatic diols, neopentyl glycol, ethoxylated bisphenol A, trimethylolpropane, pentaerythritol, glycerol, di-trimethylolpropane, hydroxyl functional polyesters, dipentaerythritol and the ethoxylated, propoxylated and polycaprolactone analogues of all the above.

Amine-(meth)acrylate adducts are those products prepared by the partial "Michael Type Addition" of primary and secondary amines to ethylenic unsaturation i.e. the double bond of (meth)acrylate containing compounds. Of particular interest here are the multi-functional (meth)acrylate monomers as mentioned above. Examples of amine-acrylate adducts are diethylamine modified trimethylolpropane triacrylate and ethanolamine modified ethoxylated trimethylolpropane triacrylate.

All of the above listed radiation curable multifunctional materials may incorporate specific hydrophilic components to facilitate their being dissolved, emulsified or dispersed in the aqueous composition of the invention. Examples are secondary amines, phosphoric acid, hydroxyl alkanoic acids and anhydrides (e.g. succinic anhydride, phthalic anhydride and tetrahydrophthalic anhydride). The resulting tertiary amines and pendent carboxylic acid groups are then neutralised. Another hydrophilic group of particular interest are ethylene and/or polyethylene oxide groups. The total amount of ethylene oxide present in the multifunctional material is preferably <80 wt %, more preferably <50 wt % and Most preferably <35 wt % based on the molecular weight of the multifunctional material.

Preferably such radiation curable multifunctional materials are substituted and unsubstituted (meth)acrylates. Preferred examples are the esters of (meth)acrylic acid with monohydric and polyhydric compounds such as ethyl, butyl, hexyl, octyl, and decyl (meth)acrylates; neopentyl glycol di(meth)acrylate, trimethylolpropane tri(meth)acrylate (TMPTA), pentaerythritol tri(meth)acrylate and tetra(meth)acrylate, caprolactone (meth)acrylates, alkoxylated (meth)acrylates, glycerol (meth)acrylates, 1,4-butanediol di(meth)acrylate, 1,6-hexanediol di(meth)acrylate, 2,2-dimethyl-3-hydroxypropyl-2,2-dimethyl-3-hydroxypropionate di(meth)acrylate, isobornyl(meth)acrylate, tripropylene glycol di(meth)acrylate, urethane (meth)acrylates, (meth)acrylated epoxides and the like. Especially suitable are (meth)acrylates such as TMPTA, pentaerythritol acrylate (PETA), 1,5-hexane diol diacrylate (HDDA) and neopentyl glycol diacrylate (NPGDA) which have a hydrophobic character.

Such radiation curable multifunctional materials are preferably present at a level of from 1 to 30 wt %, more preferably from 2 to 20 wt % and especially from 5 to 10 wt % based on the weight of the total polymer (A+B) dispersion.

In a yet further embodiment of the present invention, there is provided a composition as hereinbefore described which further comprises ≤5 wt % of an additional crosslinker based on the weight of the total polymer (A+B) dispersion, more preferably ≤3 wt %, especially preferably ≤2 wt %.

The crosslinker is preferably selected from but not limited to the group comprising the following types: isocyanate, urea-formaldehyde, melamine-formaldehyde, carbodiimide, aziridine, epoxy, silanes and/or mixtures thereof. It is preferred that the crosslinking takes place at or around ambient temperature, and does not require excess application of heat e.g. stoving.

There is further provided according to the invention an aqueous coating composition as defined above which is substantially solvent-free. By a substantially solvent-free aqueous composition, is meant a composition containing ≤1.5 wt % of organic solvent based on total polymer solids, more preferably ≤0.5 wt % and most preferably no solvent at all. It is particularly preferred that the aqueous composition contains ≤5 wt % of organic solvent based on polyurethane A solids, more preferably ≤2 wt % and most preferably no solvent at all. In this specification organic plasticisers are intended to be within the scope of the term "solvent"; these, like coalescent solvents, are also used in the art to decrease minimum film forming temperature (MFFT) although strictly speaking they are not solvents. Preferably, the composition of the invention is totally solvent (and therefore plasticiser) free.

In an embodiment of the present invention there is provided a process for the manufacture of a composition as herein described which comprises the following steps:
(I) (i) reaction of components (a)(1) to (a)(5) together to form an isocyanate-terminated prepolymer;
  (ii) neutralisation of the isocyanate-terminated prepolymer;
  (iii) dispersion of the isocyanate-terminated prepolymer in water;
  (iv) chain extension of the isocyanate-terminated prepolymer by reaction with an active-hydrogen chain extending compound to form polyurethane A; and
(II) admixture of preformed vinyl polymer B.

In a further embodiment of the invention there is provided a process for the manufacture of a composition as herein described which comprises the following steps:
(I) (i) reaction of components (a)(1) to (a)(5) together to form an isocyanate-terminated prepolymer;
  (ii) neutralisation of the isocyanate-terminated prepolymer;
  (iii) dispersion of the isocyanate-terminated prepolymer in water;
  (iv) chain extension of the isocyanate-terminated prepolymer by reaction with a active-hydrogen chain extending compound to form polyurethane A;
(II) admixture of vinyl monomer followed by reaction under conditions sufficient to effect polymerisation to form vinyl polymer B.

In both of the above embodiments, steps (ii), (iii) and (iv) may be performed in any order or simultaneously, and step (II) can occur at any stage in the process.

Preferably step (iv) is carried out after step (i). Preferably step (iv) is carried out simultaneously or after step (iii). Preferably step (ii) is carried out before or simultaneously with step (iii).

When the invention comprises a hybrid, it is preferred that the weight ratio of the polyurethane A to the other polymer in the hybrid is within the range of from 5:95 to 99:1 more preferably from 15:85 to 90:10, and most preferably from 30:70 to 80:20.

The composition of the current invention may for example be used, appropriately formulated if necessary, for the provision of films, including polishes, varnishes, lacquers, or paints. The composition of the current invention may also be used for the provision of inks or adhesives. Optionally further additives or components including defoamers, rheology control agents, thickeners, dispersing and stabilising agents (usually surfactants), wetting agents, fillers, extenders, fungicides, bacteriocides, anti-freeze agents, waxes and pigments may be added.

Preferably the composition of the invention may further comprise a pigment and/or a filler. Incorporation of pigment into currently known polymer dispersions often has a deleterious effect on stain resistance properties. A particular advantage of compositions of the current invention is that the stain resistance of the unpigmented, that is to say clear composition is maintained in the corresponding pigmented composition. Pigments are finely divided inorganic or organic powders usually of particle size in the region of 0.1 to 10 µm, which may be obtained by grinding or milling, for achieving properties such as colour, opacity, and hiding power. They are usually incorporated into a coating composition in the form of a dry powder or a uniform dispersion of the pigment in a suitable carrier medium. Pigments which may be used in the present invention include, for example, titanium dioxide, iron oxide, chromium-based compounds and metal phthalocyanine compounds. Titanium dioxide (a white pigment) is the most preferred pigment in the present invention. Fillers which may be used include calcium carbonate and china clay.

There is further provided a composition as described herein with a pigment volume concentration (PVC) of from 10 to 35%, preferably 10 to 30%, more preferably 15 to 25%, wherein PVC is defined as:

$$\frac{[\text{volume (pigment)} + \text{volume (filler)}]}{[\text{volume (pigment)} + \text{volume (filler)} + \text{volume (binder)}]}$$

wherein "binder" refers to the volume of total polymer in the composition of the present invention. By total polymer is meant polyurethane A, vinyl polymer B and other polymers present.

The compositions once applied may be allowed to dry naturally at ambient temperature, or the drying process may be accelerated by heat, in order to give a film.

A particular advantage of compositions according to the present invention when in the form of a film is the resistance of the film to staining. An important property of these films in determining the stain resistance is the moisture vapour transmission rate (MVTR), which is a measure of the barrier properties of the film, in particular to water. A high value of MVTR indicates a film with high breathability and low barrier properties, whereas a low value of MVTR indicates a film with high barrier properties. For the purposes of the present invention, lower values of MVTR are preferred. Under the conditions for measurement of MVTR described below, films according to the present invention preferably have an MVTR of ≤475 g/m²/24 h and more preferably ≤450 g/m²/24 h.

Preferred substances to which films of the present invention demonstrate stain resistance are those referred to in standard test method DIN 68861(Pt 1B), namely: acetone, ethylbutylacetate, sodium carbonate, ammonia, petrol, disinfectant, acetic acid, citric acid, ethyl alcohol, detergent, red wine, beer, mustard, salt, onion, cola, coffee, tea, blackcurrant juice, evaporated milk, water, butter, olive oil, lipstick, black rollerball, printing ink, ethanol, handcream and 'Andy' (a common Dutch detergent). It is particularly preferred that aqueous coating compositions, according to the present invention, when in the form of a film exhibit a total stain resistance value to coffee, ethanol, mustard and red wine of ≥30, more preferably of ≥35.

There is further provided according to the invention a method of coating the surfaces of a substrate comprising application of an aqueous composition of the invention to the substrate. Preferably the aqueous composition of the invention is applied by spray coating to the substrate. Preferably the substrate comprises architectural surfaces. Preferably such substrates are porous. Preferably the substrates are wood. In particular the compositions of the present invention are useful and suitable for providing the basis of protective coatings for wooden substrates (e.g. wooden floors, furniture and window frames), plastics and paper.

There is further provided according to the invention a coating obtained from an aqueous composition of the invention.

According to the invention there is also provided a film obtained from an aqueous composition of the invention.

The present invention is now further illustrated but in no way limited by reference to the following examples. Unless otherwise specified all parts, percentages, and ratios are on a weight basis.

EXAMPLES

Example 1 (E1)

A polycarbonate-diol containing aliphatic urethane-vinyl hybrid was prepared using the components listed below in Table 1. NeoRez™ R-986, a polyurethane dispersion, was used as supplied by Avecia BV.

The acid value of the polyurethane A component was 21.6 mg KOH/g polyurethane polymer. The total wt % of ring structures in the diol components comprised by the polyurethane A was 64% and the total wt % of hard segment content of the polyurethane A was 78%.

The total wt % carbon, halogen and nitrogen (C+X+N) on molecular weight of the vinyl monomer mixture was 90% and the Tg of the vinyl polymer B was 30° C. The acid value of the vinyl polymer B was 0.

The ratio of polyurethane A:vinyl polymer B in E1 was 40:60 based on polymer weight.

TABLE 1

| Component | No. | Weight (g) |
|---|---|---|
| NeoRez™ R-986 | 1 | 750.00 |
| demineralised water | 2 | 653.90 |
| t-butylhydroperoxide | 3 | 1.74 |
| demineralised water | 4 | 10.46 |
| FeEDTA | 5 | 1.74 |
| i-ascorbic acid | 6 | 0.69 |
| demineralised water | 7 | 67.72 |
| ammonia | 8 | 0.50 |
| 2-ethylhexylacrylate (I) | 9 | 66.94 |
| styrene (I) | 10 | 129.94 |
| 2-ethylhexylacrylate (II) | 11 | 66.94 |
| styrene (II) | 12 | 129.94 |
| Total Weight | | 1880.51 |
| Total solids content | | 35.0% |

A 2 liter 3-necked round bottom flask, equipped with a stirrer and a thermometer, was charged with components (1) and (2). Subsequently, the first (I) phase monomer mixture (components (9) and (10)) was added to the reaction mixture under a nitrogen atmosphere. The mixture was stirred for 60 minutes at 25° C., and a slurry of components (3) and (4) was then added followed by component (5). To initiate polymerisation of the first phase monomer mixture, 25 wt % of an initiator ((6), (7) and (8), pH>8) was added. The reaction was exothermic and reached a peak temperature, fifteen minutes after which, the second (II) phase monomer mixture (components (11) and (12)) was added and again allowed to mix for 60 minutes. A further 25 wt % of the initiator solution of components (6), (7) and (8) was then added. The reaction again exhibited an exotherm and fifteen minutes after peak temperature a post-reaction was carried out in order to polymerise residual small levels of free monomer, which comprised addition of the remainder (50 wt %) of the initiator solution of components (6), (7) and (8) over a period of 30 minutes. The batch was filtered through a filter cloth to remove any coagulum formed during the reaction. The pH of the resultant composition was about 8.

Examples 2 and 3 (E2 and E3)

Examples 2 and 3 were prepared using the method given for Example 1 and the components listed in Table 2 below.

TABLE 2

| Component | No. | Example 2 Weight (g) | Example 3 Weight (g) |
|---|---|---|---|
| NeoRez™ R-986 | 1 | 750.0 | 750.0 |
| Demineralised water | 2 | 653.9 | 653.9 |
| t-butylhydroperoxide | 3 | 1.74 | 1.74 |
| Demineralised water | 4 | 10.46 | 10.46 |
| Fe EDTA | 5 | 1.74 | 1.74 |
| i-ascorbic acid | 6 | 0.69 | 0.69 |
| Demineralised water | 7 | 67.72 | 67.72 |
| Ammonia | 8 | 0.5 | 0.5 |
| 2-ethylhexylacrylate (I) | 9 | 45.29 | 63.98 |
| Styrene (I) | 10 | 151.59 | 93.52 |
| Tetrafluoroethylmethacrylate (I) | 10 | 0.0 | 39.38 |
| 2-ethylhexylacrylate (II) | 11 | 45.29 | 63.98 |
| Styrene (II) | 12 | 151.59 | 93.52 |
| Tetrafluoroethylmethacrylate (II) | 12 | 0.0 | 39.38 |
| Acid value (vinyl polymer B) | | 0 | 0 |
| Tg (vinyl polymer B) | | 50° C. | 30° C. |
| Wt % C + X + N (vinyl polymer B) | | 96 | 94 |
| Polyurethane A:vinyl polymer B ratio | | 40:60 | 40:60 |
| Total weight | | 1180.51 | 1880.51 |
| Total solids | | 35.0 | 35.0 |

Example 4 (E4)

Example 4 was prepared by adding trimethylolpropanetriacrylate (8 g) to example 1 (100 g). The mixture was stirred for an additional 45 minutes and filtered through a filter cloth to remove any coagulum.

Example 5 (E5) and Example 6 (E6)

Step 1: Preparation of Polyol W

A polyester polyol was synthesised from the following components:
Pripol 1009 (99.4 g, a C-36 dimer acid available from Unichema), adipic acid (24.8 g) and 1,4-cyclohexane dimethanol (CHDM 75.8 g).

The resultant polyester polyol W had a hydroxyl value of 107.5 mg KOH/g.

Step 2: Preparation of Polyurethane Dispersion

A 2000 cm$^2$ flask equipped with a thermometer and overhead stirrer was charged with Desmodur W (441.95 g available from Bayer), NMP (287.50 g), DMPA (49.88 g), CHDM (53.44 g) and Polyol W prepared in step 1 (167.24 g). This mixture was heated to 50° C. and tin octoate (0.12 g) was added. The reaction was allowed to exotherm to 90° C. After the exotherm was complete the reaction was kept at 90° C. for 2 hours. The isocyanate-content of the prepolymer was 6.04% (theoretical 6.61%). After cooling the prepolymer to 75° C., triethylamine (TEA 41.39 g) was added.

A dispersion of the isocyanate-terminated prepolymer was made by feeding 833.11 g of the TEA neutralised, isocyanate-terminated prepolymer over 1 hour to 719.01 g of deionised water containing 9.50 g of Disponil AFX4060 (available from Cognis). The isocyanate-terminated prepolymer temperature was kept at 70° C. and the dispersion temperature was kept between 25 to 30° C. When the prepolymer feed was completed, a 15.2% hydrazine solution (102.94 g) was added together with water (25.00 g).

The resulting polyurethane dispersion (PUD) had a solids content of 30.0 wt %. The acid value of the polyurethane was 28.6 mg KOH/g. Polyol (a)(5) was represented by CHDM and polyol (a)(4) was represented by Polyol W. The ring structure containing building block in Polyol W was CHDM. Therefore the total wt % of ring structures in the diol components comprised by the polyurethane was 53%, the total wt % of hard segment content of the polyurethane was 84%.

The ring structure content of polyols (a)(3) to (a)(5) for the polyurethane dispersion was calculated as follows:
- (a)(3): not present, therefore no ring structure.
- (a)(4): Polyol W which comprises 3 building blocks, Pripol 1009 (no ring structure), adipic acid (no ring structure) and CHDM (which has a ring structure).

Therefore the wt % of ring structure in polyol W is 75.8/(99.4+24.8+75.8)=37.9%. Amount used=167.24 g, therefore ring structure=63.38 g.
- (a)(5): CHDM (which has a ring structure) 53.44 g=100%.

Therefore total ring structure content of (a)(3) to (a)(5) (63.38+53.44)/(167.24+53.44)×100=52.94 wt %.

Step 3: Preparation of a Polyurethane/Vinyl Hybrid

The free-radical polymerisation for producing a polyurethane vinyl hybrid dispersion having an polyurethane A:vinyl polymer B ratio of 50:50 (E5) and 35:65 (E6) was carried out in the same way as described above for E1 using the polyurethane dispersion prepared in Step 2 above. The components that were used are listed below in Table 3. The total wt % C+X+N on molecular weight of the vinyl monomer mixture was 90% and the Tg of the vinyl polymer B component was 30 C. The pH of the resultant compositions was approximately 8.

TABLE 3

| Component | No | Example 5 Weight (g) | Example 6 Weight (g) |
| --- | --- | --- | --- |
| PUD - step 2 | 1 | 750.00 | 750.00 |
| demineralised water | 2 | 303.03 | 584.18 |
| t-butylhydroperoxide | 3 | 1.00 | 1.85 |
| demineralised water | 4 | 5.98 | 11.10 |
| FeEDTA | 5 | 1.00 | 1.85 |
| i-ascorbic acid | 6 | 0.39 | 0.73 |
| demineralised water | 7 | 38.48 | 71.89 |
| ammonia | 8 | 0.50 | 0.50 |
| 2-ethylhexylacrylate (I) | 9 | 38.25 | 71.04 |
| styrene (I) | 10 | 74.25 | 137.89 |
| 2-ethylhexylacrylate (II) | 11 | 38.25 | 71.04 |
| styrene (II) | 12 | 74.25 | 137.89 |
| Total Weight | | 1325.37 | 1839.97 |
| Total Solids | | 34.0 | 35.0 |

Comparative Example 1 (CE1)

Step 1: Preparation of Polyurethane Dispersion

A 2000 cm³ flask equipped with a thermometer and overhead stirrer was charged with Desmodur W (available from Bayer) (255.35 g), NMP (294.57 g), DMPA (40.67 g) and Priplast 3192 (a polyester polyol based on a C-36 dimer acid and 1,6-hexane diol, 434.01 g, available from Unichema). This mixture was heated to 50° C. and tin octoate (0.12 g) was added. The reaction was allowed to exotherm to 90° C. After the exotherm was complete the reaction was kept at 90° C. for 2 hours. The isocyanate content of the prepolymer was 3.52% (theoretical 3.73%). After cooling the prepolymer to 75° C., TEA (33.76 g) was added.

A dispersion of the isocyanate-terminated prepolymer was made by feeding 875.00 g of the TEA neutralised isocyanate-terminated prepolymer over 1 hour to 794.92 g of deionised water containing 17.99 g of Abex 2545 (a surfactant available from Rhodia) The isocyanate-terminated prepolymer temperature during dispersion was kept at 70° C. and the dispersion temperature was controlled between 25 to 30° C. When the prepolymer feed was completed, a 15.2% hydrazine solution (63.52 g) was added together with water (25.00 g).

The resulting polyurethane dispersion had a solids content of 35.0 wt %. The acid value of the polyurethane was 21.6 mg KOH/g. The total wt % of ring structures in the polyol components (a)(3) to (a)(5) comprised by the polyurethane component was 0%, the total wt % of hard segment content of the polyurethane was 41%.

Step 2: Preparation of a Polyurethane Vinyl Hybrid

The radical polymerisation for producing a polyurethane-vinyl hybrid dispersion having a polyurethane A:vinyl polymer B ratio of 40:60 was carried out in the same way as described above for E1 using the polyurethane dispersion prepared above in Step 1 of CE1. The components that were used are listed below in Table 4. The total wt % C+X+N on molecular weight of the vinyl monomer mixture was 90% and the Tg of the vinyl polymer B was 30° C. The pH of the resultant composition was approximately 8.

TABLE 4

| Component | No. | Weight used (g) |
| --- | --- | --- |
| PUD - step 1 (CE1) | 1 | 750.00 |
| demineralised water | 2 | 653.90 |
| t-butylhydroperoxide | 3 | 1.74 |
| demineralised water | 4 | 10.46 |
| FeEDTA | 5 | 1.74 |
| i-ascorbic acid | 6 | 0.69 |
| demineralised water | 7 | 67.72 |
| ammonia | 8 | 0.50 |
| 2-ethylhexylacrylate (I) | 9 | 66.94 |
| styrene (I) | 10 | 129.94 |
| 2-ethylhexylacrylate (II) | 11 | 66.94 |
| styrene (II) | 12 | 129.94 |
| Total weight | | 1880.51 |
| Total solids | | 35.0 |

Comparative Example 2 (CE2)

The comparative example presented in WO 99/16805 was prepared as described therein to give a polyurethane-vinyl hybrid with a polyurethane A:vinyl polymer B ratio of 20:80, the Tg of the vinyl polymer B was 62° C. and the total wt % C+X+N on molecular weight of the vinyl monomer mixture was 77%. The hard segment content of the polyurethane A was 71.8%. Total wt % of ring structures in the diol components (a)(3) to (a)(5) comprised by the polyurethane A was 25%.

Testing Methods
1. Moisture Vapour Transmission Rate (MVTR)

All MVTR testing for films derived from compositions according to the present invention was carried out under what are normally referred to as "tropical" conditions and with wet film thickness of 12 micron.

Clear Formulation

The formulation given in Table 5 was used for all examples except E4 to determine MVTR values.

TABLE 5

| No. | Ingredient | Amount (g) | Type of material | Supplier |
|---|---|---|---|---|
| 1 | Example dispersion | 87.50 | Binder | n.a. |
| 2 | Dowanol ™ DPnB | 8.75 | Coalescent | Dow Chemical |
| 3 | Demineralised water | 3.75 | n.a. | n.a. |

In the case of E4, the formulation given in Table 6 was used to determine MVTR value.

TABLE 6

| No | Ingredient | Amount (g) | Type of material | Supplier |
|---|---|---|---|---|
| 1 | E4 dispersion | 87.50 | Binder | n.a. |
| 2 | Dowanol ™ DPnB | 8.75 | Coalescent | Dow Chemical |
| 3 | Darocure 1173 | 0.87 | Photo initiator | Ciba |
| 4 | Demineralised water | 2.88 | n.a. | n.a. |

Ingredients No.s 2, 3 and 4 were added to 1 with stirring. The formulated samples were allowed to equilibrate for at least 24 hours at room temperature prior to testing.

MVTR Test Conditions (ASTM D1653-91a)

The formulated samples except for formulated E4 were applied (12 micron wet film thickness) onto china clay coated paper board (400 g/m², available from HCG Grafigroep, Netherlands) and allowed to dry at room temperature for 1 hour. Subsequently, the films were aged in an oven at 50° C. for 16 hours. After ageing, the films were allowed to cool down to room temperature for at least 1 hour.

In the case of E4, the formulated sample was applied (12 micron wet film thickness) onto china clay coated paper board (400 g/m², available from HCG Grafigroep, Netherlands) and allowed to dry at room temperature for 5 minutes, followed by 5 minutes at 60° C. Subsequently the film was UV cured (2×400 mJ energy; UV lamp=80 W at 240 nm). Finally the film was aged in an oven at 50° C. for 16 hours. After ageing, the film was allowed to cool down to room temperature for at least 1 hour.

For each coated paper board at least three dishes were prepared for MVTR assessment. Each dish was first filled with desiccant (anhydrous calcium chloride) to within 6 mm of the top edge, and a thin layer of paraffin wax was smeared around the ring of each dish. Using a circular cutting knife the three samples of paper board were cut and each one was placed (coated side up) over a rim of a dish. A metal ring was placed on the dish and the initial weight of the dish was measured. The dish was secured with two elastic bands and placed in a humidity cabinet, which was maintained at a constant temperature of 38° C. and relative humidity (R.H.) of 90% (i.e. tropical conditions). The dishes were weighed after 1 and 4 days (without elastic bands) and the MVTR value was calculated using the three formulae below:

$$MVTR(1) = \frac{(1 \text{ day weight}(g) - \text{initial weight}(g)) \times 24 \text{ h}}{\text{time (h)} \times \text{area substrate (m}^2)} \quad (1)$$

$$MVTR(4) = \frac{(4 \text{ day weight}(g) - 1 \text{ day weight}(g)) \times 24 \text{ h}}{\text{time (h)} \times \text{area substrate (m}^2)} \quad (2)$$

$$MVTR(\text{average}) = \frac{MVTR(1) + MVTR(4)}{2} \quad (3)$$

All values reported below in Table 7 below are MVTR (average) values in units of g/m²/24 h. In all cases the exposed substrate area was 5×10⁻³ m².

TABLE 7

| Formulated Example | MVTR (average) (g/m²/24h) |
|---|---|
| E1 | 463 |
| E2 | 428 |
| E3 | 466 |
| E4 | 430 |
| E5 | 440 |
| E6 | 449 |
| CE1 | 684 |
| CE2 | 790 |

2. Stain Resistance Assessment
2.1 Clear Formulation

The clear formulation given in Table 8 below was used for all examples except E4 to determine the level of stain resistance of the final coated material.

TABLE 8

| No | Ingredient | Amount (g) | Type of material | Supplier |
|---|---|---|---|---|
| 1 | Example dispersion | 85.18 | Binder | n.a. |
| 2 | Dowanol ™ DPM | 7.10 | Coalescent | Dow Chemical |
| 3 | Dowanol ™ DPnB | 1.42 | Coalescent | Dow Chemical |
| 4 | Byk ™ 346 | 0.34 | wetting agent | Byk Chemie |
| 5 | TS-100 | 0.85 | matting agent | Degussa |
| 6 | Aquacer ™ 513 | 3.83 | wax | Byk Chemie |
| 7 | Byk ™ 024 | 0.68 | defoamer | Byk Chemie |
| 8 | BR-125/water (1/1) | 0.60 | thickening agent | Coatex |

Ingredients 2 and 3 were premixed and added to 1 while stirring. Subsequently ingredients 4 to 8 were added with stirring in respective order. The formulated samples were left to equilibrate for at least 24 hours at room temperature.

In the case of E4, the clear formulation given in Table 9 below was used to determine the level of stain resistance of the final coated material. All amounts are parts by weight.

TABLE 9

| No | Ingredient | Amount (g) | Type of Material | Supplier |
|---|---|---|---|---|
| 1 | E4 dispersion | 50.0 | binder | n.a. |
| 2 | Byk ™ 346 | 0.2 | wetting agent | Byk Chemie |
| 3 | Darocure 1173 | 0.5 | Photo initiator | Ciba |

Ingredients 2 and 3 were added to 1 while stirring. The formulated samples were left to equilibrate for at least 24 hours at room temperature.

2.2 Pigmented Formulation

The pigmented formulation given in Table 10 below was used for all examples except E4 to determine the level of stain resistance of the final coated material.

TABLE 10

| No | Ingredient | Amount | Type of material | Supplier |
|---|---|---|---|---|
| 1 | Example dispersion | 62.17 | Binder | n.a. |
| 2 | Dowanol ™ DPM | 5.18 | Coalescent | Dow Chemical |
| 3 | Dowanol ™ DPnB | 1.04 | Coalescent | Dow Chemical |
| 4 | Byk ™ 346 | 0.25 | wetting agent | Byk Chemie |
| 5 | TS-100 | 0.62 | matting agent | Degussa |
| 6 | Aquacer ™ 513 | 2.80 | wax | Byk Chemie |
| 7 | Byk ™ 024 | 0.50 | defoamer | Byk Chemie |
| 8 | BR-125 / demi water (1/1) | 0.44 | thickener agent | Coatex |
| 9 | Propylene glycol | 1.88 | coalescent | BASF/Lyondell |
| 10 | Demineralised water | 4.17 | n.a. | n.a. |
| 11 | AMP-95 | 0.21 | neutralizing agent | Agnus Chemie |
| 12 | Dehydran ™ 1293 | 0.42 | defoamer | Cognis |
| 13 | Disperse Ayd ™ W-22 | 0.31 | wetting agent | Elementis |
| 14 | NeoCryl ™ BT-24 | 1.56 | pigment dispersant | Avecia BV |
| 15 | Tioxide ™ TR-92 | 18.45 | pigment | Huntsman |

Ingredients 2 and 3 were premixed and added to 1 while stirring. Subsequently ingredients 4 to 8 were added in respective order. Ingredients 9 to 15 were premixed in respective order to prepare the pigment paste. Finally, this premix was added and the formulation was mixed at high speed. The formulated samples were left to equilibrate for at least 24 hours at room temperature.

In the case of E4, the following pigmented formulation given in Table 11 below was used to determine the level of stain resistance of the final coated material.

TABLE 11

| No. | Ingredient | Amount | Type of material | Supplier |
|---|---|---|---|---|
| 1 | E4 dispersion | 50.00 | Binder | n.a. |
| 2 | Byk ™ 346 | 0.20 | wetting agent | Byk Chemie |
| 3 | Propylene glycol | 1.16 | coalescent | BASF/Lyondell |
| 4 | Demineralised water | 2.58 | n.a. | n.a. |
| 5 | AMP-95 | 0.13 | neutralizing agent | Agnus Chemie |
| 6 | Dehydran ™ 1293 | 0.26 | defoamer | Cognis |
| 7 | Disperse Ayd ™ W-22 | 0.19 | wetting agent | Elementis |
| 8 | NeoCryl ™ BT-24 | 0.96 | pigment dispersant | Avecia BV |
| 9 | Tioxide ™ TR-92 | 11.41 | pigment | Huntsman |
| 10 | Darocure 4265 | 0.50 | Photo initiator | Ciba |

Ingredients 2 and 10 were added to 1 while stirring. Ingredients 3 to 9 were premixed in respective order to prepare the pigment paste. Finally, this premix was added and the formulation was mixed at high speed. The formulated samples were left to equilibrate for at least 24 hours at room temperature.

2.3 Stain Resistance (DIN 68.861. Pt 1B)

The formulated examples, except for E4, prepared as described above (either clear or pigmented) were cast onto a Leneta test chart using a wire rod at a wet film thickness of 100 micron. The cast films were then allowed to dry at room temperature for 1 hour, followed by ageing of the coatings at 50° C. for 16 hours. The coatings were allowed to cool to room temperature for 1 hour.

In the case of formulated E4 the sample was applied (100 micron wet film thickness) onto a Leneta test chart using a wire rod and allowed to dry at room temperature for 5 minutes, followed by 5 minutes at 60° C. Subsequently, the film was UV cured (2×400 mJ energy; High pressure mercury UV lamp=80 W at 240 nm). Finally, the film was allowed to cool down to room temperature for at least 1 hour. In the case of the pigmented formulated sample the following UV curing conditions were taken; 2×600 mJ; 120 W, 420 nm.

The stain resistance of the coated cards towards the following stains were then assessed: coffee, ethanol (48%), mustard and red wine. In all four cases, a spot (1 cm$^2$) of the respective stain was placed on the coating and covered with a piece of filter paper and a watch glass. In the case of coffee and ethanol (48%) resistance assessment, the spot was left for 16 hours, whereas for mustard and red wine it was left for 5 hours. After these periods, the spot was gently wiped off with a tissue and the film was assessed for its integrity. This was rated between 0 to 10, where 0=film totally destroyed/strongly discoloured and 10=film fully intact without any defects/discolouration. The total value of the four respective stain resistances was then calculated, where the theoretical maximum value would

TABLE 12

| STAIN | E1 | E2 | E3 | E4 | E5 | E6 | CE1 | CE2 |
|---|---|---|---|---|---|---|---|---|
| Coffee | 10 | 10 | 10 | 10 | 10 | 10 | 4 | 6 |
| Ethanol | 7 | 8 | 8 | 9 | 10 | 9 | 9 | 9 |
| Mustard | 10 | 10 | 8 | 10 | 10 | 10 | 2 | 5 |
| Red wine | 10 | 10 | 10 | 10 | 10 | 10 | 5 | 6 |
| Total | 37 | 38 | 36 | 39 | 40 | 39 | 20 | 26 |

TABLE 13

| STAIN | E1 | E2 | E3 | E4 | E5 | E6 | CE1 | CE2 |
|---|---|---|---|---|---|---|---|---|
| Coffee | 9 | 8 | 9 | 9 | 6 | 9 | 4 | 5 |
| Ethanol | 9 | 8 | 8 | 9 | 9 | 9 | 8 | 9 |
| Mustard | 9 | 9 | 8 | 9 | 10 | 10 | 2 | 4 |
| Red wine | 10 | 10 | 10 | 10 | 10 | 10 | 3 | 5 |
| Total | 37 | 35 | 36 | 37 | 35 | 38 | 17 | 23 |

The invention claimed is:

1. An aqueous coating composition comprising:
   (i) 20 to 80 wt % of a polyurethane A obtained by the reaction of:
      (a) an isocyanate-terminated prepolymer formed from components comprising:
         (1) 20 to 80 wt % of at least one polyisocyanate;
         (2) 3 to 10 wt % of at least one isocyanate-reactive polyol of weight average molecular weight <500 Daltons, containing at least one ionic or potentially ionic water-dispersing group;
         (3) 0 to 15 wt % of at least one isocyanate-reactive polyol containing non ionic water-dispersing groups;
         (4) 17 to 77 wt % of at least one isocyanate-reactive polyol other than (3) having a weight average molecular weight within a range of 500 to 8000 Daltons and a ring structure content >30 wt. %;
         (5) 0 to 20 wt % of at least one isocyanate-reactive polyol other than (2) or (3) of weight average molecular weight 500 Daltons;
      where (1), (2), (3), (4) and (5) add up to 100%;
      wherein the polyols (a)(3) to (5) have a total ring structure content 48 wt %; and
      (b) an active-hydrogen chain extending compound;
      wherein polyurethane A has an acid value in the range of from 8 to 40 mg KOH/g and a hard segment content ≥40 wt % by weight of polyurethane A; and
   (ii) 80 to 20 wt % of a vinyl polymer B with a glass transition temperature ≤20° C., wherein vinyl polymer B comprises vinyl monomers comprising in total ≤70 wt % carbon, nitrogen and halogen based on vinyl monomer molecular weight; wherein
   (i) and (ii) add up to 100%; and wherein
   a film having a wet film thickness of 12 microns formed of the composition exhibits a moisture vapour transmission rate of ≤500 g/m²/24 h.

2. An aqueous coating composition according to claim 1 wherein polyurethane A has a weight average molecular weight in the range of from 50,000 to 1,000,000 Daltons.

3. An aqueous coating composition according to claim 1 wherein the acid value of vinyl polymer B is ≤10 mg KOH/g polymer.

4. An aqueous coating composition according to claim 1 wherein the vinyl polymer B has been formed using a multistage polymerisation process to form two or more vinyl polymer phases of different compositions.

5. An aqueous coating composition according to claim 4 wherein there is a difference in Tg values between at least two vinyl polymer phases of ≥20° C.

6. An aqueous coating composition according to claim 1 wherein vinyl polymer B has a weight average molecular weight in the range of from 50,000 to 6,000,000 Daltons.

7. An aqueous coating composition according to claim 1 wherein vinyl polymer B has been formed in the presence of polyurethane A.

8. An aqueous coating composition according to claim 1 further comprising a radiation curable multifunctional material.

9. An aqueous coating composition according to claim 8 where the radiation curable multifunctional material is selected from the group consisting of epoxy(meth)acrylates, urethane (meth)acrylates, multifunctional (meth)acrylate monomers, uv curable urethane dispersions and amine-(meth)acrylate adducts.

10. An aqueous coating composition according to claim 1 which further comprises a pigment.

11. An aqueous coating composition according to claim 10 with a pigment volume concentration of from 10 to 35%.

12. An aqueous coating composition according to claim 1 which is substantially solvent free.

13. A process for the manufacture of an aqueous coating composition according to claim 1 which comprises the following steps:
   (I) (i) reaction of components (a)(1) to (a)(5) together to form an isocyanate-terminated prepolymer;
      (ii) neutralisation of the isocyanate-terminated prepolymer;
      (iii) dispersion of the isocyanate-terminated prepolymer in water;
      (iv) chain extension of the isocyanate-terminated prepolymer by reaction with an active-hydrogen chain extending compound to form polyurethane A; and
   (II) admixture of preformed vinyl polymer B.

14. A process for the manufacture of an aqueous coating composition according to claim 1 which comprises the following steps:
   (I) (i) reaction of components (a)(1) to (a)(5) to form an isocyanate-terminated prepolymer;
      (ii) neutralisation of the isocyanate-terminated prepolymer;
      (iii) dispersion of the isocyanate-terminated prepolymer in water;
      (iv) chain extension of the isocyanate-terminated prepolymer by reaction with an active-hydrogen chain extending compound to form polyurethane A;
   (II) admixture of vinyl monomer followed by reaction under conditions sufficient to effect emulsion polymerisation to form vinyl polymer B.

15. A film obtained from an aqueous coating composition according to claim 1.

16. A coating obtained from an aqueous coating composition according to claim 1.

17. A method of coating the surfaces of a substrate comprising application of an aqueous coating composition according to claim 1 to the substrate.

18. A method of coating according to claim 17 wherein the substrate is porous.

19. A method of coating according to claim 17 wherein the substrate is wood.

* * * * *